United States Patent
Walker et al.

[19]

[11] Patent Number: 6,012,276
[45] Date of Patent: Jan. 11, 2000

[54] CANE SEPARATOR FOR DRIED-ON-THE-VINE RAISIN HARVESTER

[76] Inventors: David L. Walker, 493 W. Caruthers Ave., Caruthers, Calif. 93609; Ray Austin, Jr., 1180 S. Valentine, Fresno, Calif. 93706

[21] Appl. No.: 08/941,897

[22] Filed: Sep. 30, 1997

[51] Int. Cl.⁷ .......................... A01D 46/00; A01F 12/00
[52] U.S. Cl. ..................... 56/330; 56/328.1; 460/113; 460/90; 209/671; 209/667
[58] Field of Search .......................... 56/330, 331, 327.1, 56/328.1, 329, 340.1; 460/90, 113, 114, 116, 119; 209/667, 671, 672

[56] References Cited

U.S. PATENT DOCUMENTS

| | | |
|---|---|---|
| 2,997,086 | 8/1961 | Armer . |
| 3,117,671 | 1/1964 | Pearce et al. . |
| 3,294,177 | 12/1966 | Schaal et al. ............................ 171/42 |
| 3,581,747 | 6/1971 | Scribner ................................ 460/130 |
| 3,590,993 | 7/1971 | Baker . |
| 3,916,913 | 11/1975 | Looker et al. ............................ 130/30 |
| 3,931,823 | 1/1976 | Burton .................................... 130/30 |
| 4,221,665 | 9/1980 | Decker ................................... 209/247 |
| 4,240,902 | 12/1980 | Agee et al. ............................. 209/241 |
| 4,445,316 | 5/1984 | Browning et al. ....................... 56/330 |
| 4,507,911 | 4/1985 | Wolf et al. ............................... 56/327 |
| 5,076,046 | 12/1991 | Schilling ............................... 56/327.1 |
| 5,099,636 | 3/1992 | Yoder .................................... 56/327.1 |
| 5,355,667 | 10/1994 | Scott ...................................... 56/330 |
| 5,557,883 | 9/1996 | Walker ..................................... 47/46 |
| 5,816,912 | 10/1998 | Clark et al. ............................ 460/114 |

*Primary Examiner*—H. Shackelford
*Attorney, Agent, or Firm*—Townsend & Townsend & Crew LLP

[57] ABSTRACT

A harvester (10) includes a separator (22) to help separate unwanted plant material from a crop. Separator (22) includes a series of paddles (46) which are rotated in unison by a drive system (50). The crop, which will often comprise a vine or tree crop, and which will ideally comprise raisins (14), falls between rotating paddles (46). Plant materials, such as cane (60), is transported by the tops of the rotating paddles from over cane separator (22).

18 Claims, 4 Drawing Sheets

CANE SEPARATOR FOR DRIED-ON-THE-VINE RAISIN HARVESTER

BACKGROUND OF THE INVENTION

The present invention is generally related to devices, systems, and methods for separating crops from extraneous plant materials, and in particular, provides a crop separator to separate canes and leaves from dried on the vine raisins, twigs and sticks from tree crops such as olives, and other problematic harvesting byproducts from the desired crop.

Raisins sold in the United States have traditionally been dried in the sun after picking. The picked raisins are often placed on drying trays or strips of paper. These trays or paper strips are then placed on dirt mounded or terraced between the rows of vines. It usually takes about three weeks to sun dry raisins in the Central Valley of California, the leading raisin production region in the United States.

Although the traditional dried-on-the-ground methods for producing raisins are both simple and cost effective, this technique does have significant disadvantages. One particular disadvantage of dried-on-the-ground raisin production is the possibility of rain during the drying season. Rain which occurs during the three week drying period increases the susceptibility of the raisins to mold, infestation, and rot, and can potentially ruin the crop. Also, especially under more humid conditions, raisins may be attacked while on the ground by certain molds or mildew which can ruin them for human consumption. Another significant problem with dried-on-the-ground raisins is the cost associated with the separate production process steps: picking the grapes, placing the trays on the dirt mounds formed between the rows, and gathering the raisins after they have dried.

A variety of alternative methods for producing raisins have been proposed with varying degrees of success. Efforts have been made to mechanically harvest green grapes and automatically deposit them onto strips of drying paper between the rows. Unfortunately, because of the violence with which grapes are mechanically harvested, a certain amount of damage occurs to the grapes, leaving the grapes sticky. While this is not a problem if the grapes are immediately crushed (such as when making wine) leaving damaged grapes on trays on the ground may create lower raisin quality and could promote the growth of molds and mildew, as well as insect damage.

Still further grape production methods have been used. Raisins having a golden color may be produced by dipping the grapes in a caustic soda and water solution, exposing the dipped grapes to sulfur and carbon dioxide, and then drying the exposed grapes in a dehydrator. Alternatively, green grapes may be dipped in a hot water solution to split the skins and to promote drying. In Australia, green grapes are sprayed with an oil emulsion (typically 2% aqueous solution of methaloleate and potassium carbonate) to create tiny cracks in the skin which aid drying, as well as to produce a lighter color raisin.

An alternative Australian raisin production raisin system, sometimes called the Irymple Trellis System, dries the raisins on the vine prior to harvesting. In that system, the fruiting canes are supported on a horizontal trellis system along one side of the row, while replacement canes are supported along a reclined trellis system on the other side of the row. The fruit develops from the fruiting canes and hangs freely below a leaf canopy. When the fruit is mature, the grape bunches are sprayed with an oil emulsion, such as methaloleate, and the fruiting canes are cut to speed drying of the grapes. It has been found that limiting the number of cut canes to no more than about 50% of the total canopy avoids injuring the vine and reducing the next year's harvest. U.S. Pat. No. 5,557,883, the full disclosure of which is incorporated herein by reference, describes an improved trellis system and method which are particularly well suited for supporting grape vines to produce dried-on-the-vine raisins.

While dried-on-the-vine raisin production methods offer significant advantages over dried-on-the-ground methods, harvesting of the dried raisins remains somewhat problematic. In particular, canes and other plant materials are often detached from the vines when grapes and other vine crops are mechanically harvested. These tough, elongate canes can play havoc on the harvesting and collecting equipment. The relatively light weight of a dried-on-the-vine raisin and the presence of the severed canes makes the separation of the dried raisins from the cane both particularly important and particularly difficult.

In light of the above, it would be advantageous to provide improved devices, systems, and methods for separating canes and other plant material from crops, particularly from dried-on-the-vine raisins. It would be particularly advantageous if these improved techniques were adapted for use in the fields with the harvesting equipment, so as to avoid the damage and delays which result from handling the combined crop and plant materials.

SUMMARY OF THE INVENTION

The present invention generally provides a crop/plant material separator, particularly for use with a harvester in the field. Separation is generally provided by a series of rotating paddles on which the harvested crop and plant material are deposited. The rotating paddles, which generally comprise flat thin panels, urge the plant material toward the adjacent paddle in the series so that the plant materials bumps along from paddle to paddle. The crop falls between the paddles, and the bumping motion of the paddles against the plant material may also separate the crop from this unwanted byproduct.

In a first aspect, the present invention provides a device for separating a crop from plant material. The device comprises a frame and a plurality of paddles rotatably mounted to the frame. Each paddle is rotatable about an axis, and the axes of the paddles are aligned to define a path. A drive system is drivingly coupled to the paddles. The drive system rotates the paddles in unison so that the rotating paddles can transport the fine material along the path. The paddles are sized and positioned along the path such that the crop will fall from the path between the rotating paddles.

In another aspect, the present invention provides a device for use with a harvester in a field to separate a vine crop from the unwanted vine material. The device comprises a frame adapted for mounting on the harvester. A plurality of paddles are mounted to the frame. Each paddle is rotatable about an axis and has a lateral width relative to the axis. The overall thickness of the paddle is less than the width and the axes of the paddles are sequentially aligned, allowing the paddles to define a path across the axes. Surprisingly, adjacent axes are separated by less than their widths. This is made possible by a drive system which is rotationally coupled to the paddles. The drive system maintains an offset angle between adjacent paddles so that the paddles can rotate in unison, thereby avoiding interference between adjacent rotating paddles. Hence, the paddles transport the vine material along the path, but are sized and positioned along the path such that the vine crop will fall from the path between the rotating paddles.

In a method according to the present invention, a crop is harvested by detaching the crop from crop plants. Plant material is also detached from the plants. The crop and detached plant material are situated over a series of paddles. Each paddle is rotated about an associated axis, so that the paddles pass the detached plant material sequentially along a series of paddles. The crop falls between the paddles, and is gathered from under the paddles.

DESCRIPTION OF THE PREFERRED EMBODIMENT

The present invention provides improved devices, systems, and methods for separating crops from plant material. These structures and techniques will find uses for a wide variety of crops, and particularly for separating vine crops from vine material. Advantageous applications will also be found for harvesting of tree crops, particularly for the harvesting of olives, and can be used to detach and separate such tree crops from the sticks and twigs detached from the tree during mechanical harvesting. The most immediate application of the present invention, however, will be for use with a harvester to separate dried-on-the-vine raisins from the canes of the grape plants.

Figure 1:
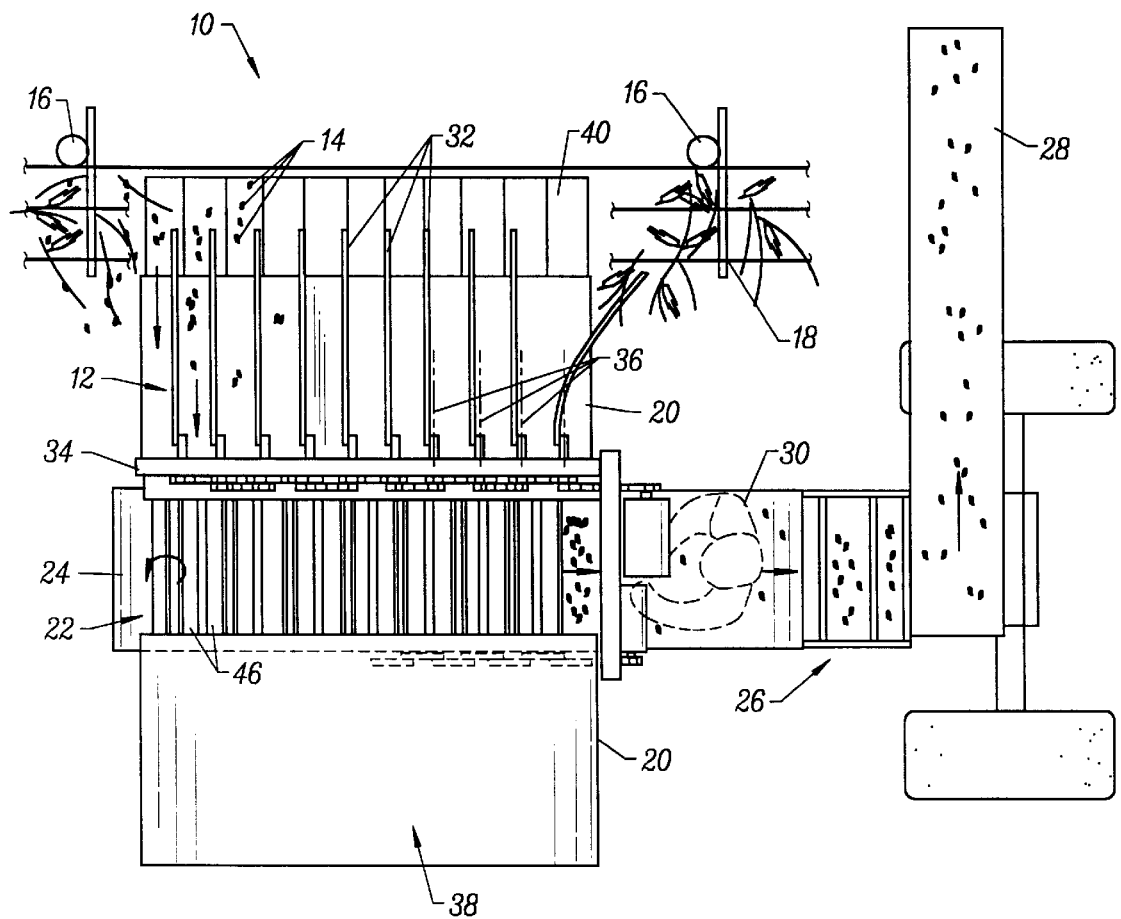
FIG. 1 is a top view of a harvester having a cane separator with a series of rotating paddles, and also illustrates a method for using such a harvester to harvest dried-on-the-vine raisins, according to the principles of the present invention.

Referring now to FIG. 1, a harvester 10 makes use of a harvester head 12 to detach dried-on-the-vine raisins 14 from grape vines 16. Vines 16 are supported by a trellis system 18, the trellis system ideally comprising a structure such as that described in U.S. Pat. No. 5,557,883, the full disclosure of which is incorporated herein by reference.

In addition to harvester head 12, harvester 10 generally includes a sloped tray 20 which directs the detached raisins 14 towards a cane separator 22. Cane separator 22 generally directs detached canes from vine 16 towards a forward end 24 of harvester 10, while raisins 14 fall through the cane separator to be gathered by a conveyor system 26. Conveyer system 26 transports the separated raisins rearward and upward, eventually directing the grapes laterally along a discharge conveyor 28 for collection in a truck or bin moving forward along with harvester 10 (not shown).

Typically, harvester 10 will be drawn forward between rows defined by trellis system 18 using a conventional tractor. The tractor will often provide hydraulic and/or electrical power to harvester 10 for driving harvester head 12, cane separator 22, conveyer system 26, and the like. Harvester 10 may include provisions for an operator 30 to monitor and/or direct the harvesting process. In alternative embodiments, the components of harvester 10 may be carried on the tractor, or may be provided on a specialized self-powered harvester, within the scope of the present invention.

Figure 2:
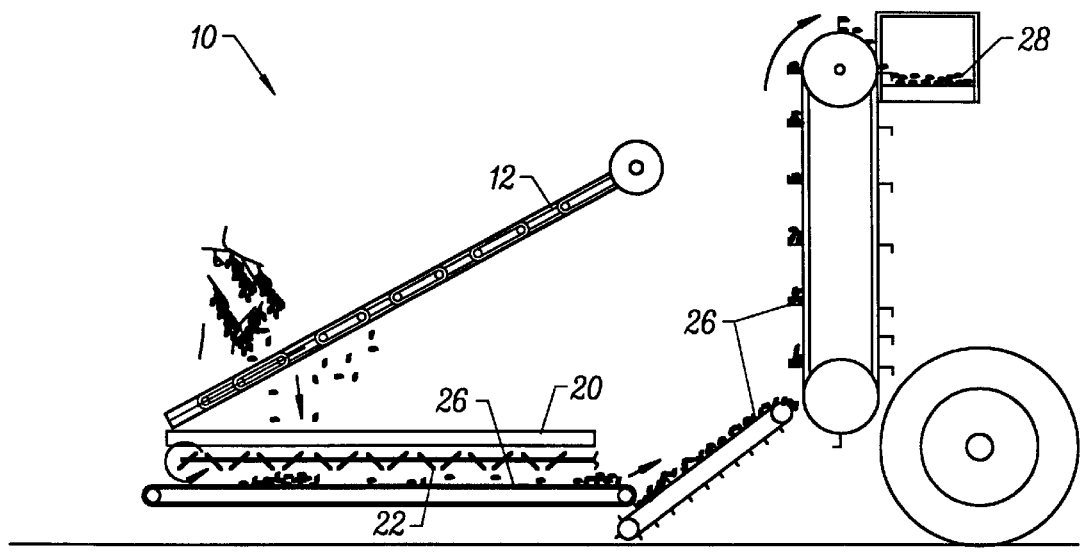
FIG. 2 is a simplified side view of the harvester of FIG. 1, showing how the cane separator transports the canes in one direction while a conveyor belt below the separator moves the raisins in the opposite direction.
Figure 3:
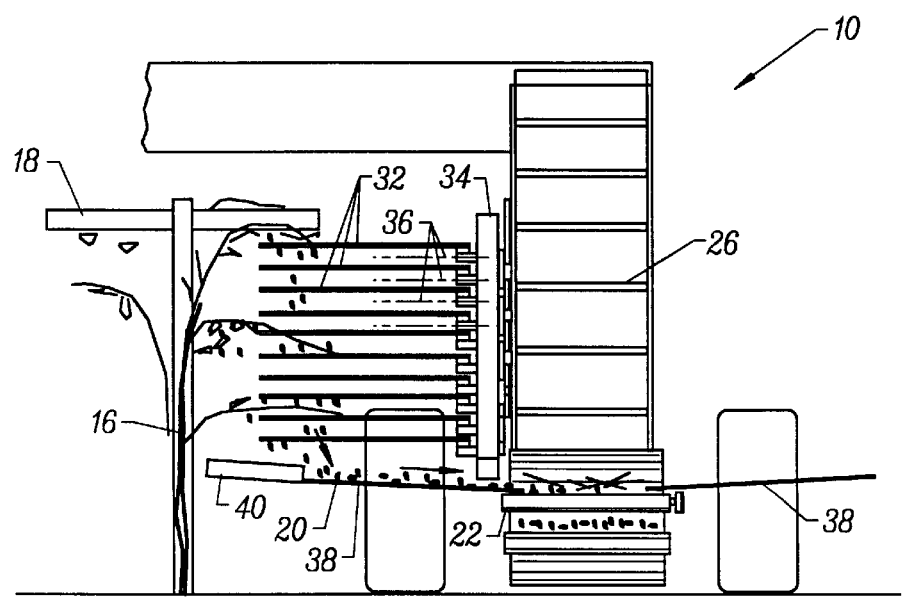
FIG. 3 is a front view of the harvester of FIG. 1, showing a harvester head extending into a raisin vine trellis system, and shows how the detached raisins and other vine material are directed onto the cane separator by a shaker plate.

The operation of harvester head 12 can be understood with reference to FIGS. 1–3. Harvester head 12 makes use of a series of beater rods 32 which extend in cantilever from a harvester head frame 34 into vines 16. As described in more detail in our co-pending U.S. patent application Ser. No. 08/940,434, entitled "HARVESTER HEAD FOR DRIED-ON-THE-VINE RAISINS," filed concurrently herewith, the full disclosure of which is incorporated herein by reference, beater rods 32 each orbit around an offset axis 36. The orbiting beater rods strike and detach raisins 14 from vines 16, and also separate some canes and other extraneous vine material from the vines.

To prevent the orbiting beater rods from damaging trellis system 18, and also to avoid damage to the primary structures of vines 16, beater rods 32 are formed of a resiliently flexible material such as fiberglass, a resilient polymer, or the like. As can be understood with reference to FIG. 1, this also allows the rotating beater rods to flex as harvester 10 is drawn forward, thereby avoiding damage to the harvester head, trellis structure, and vines.

As mentioned above, raisins 14 will generally drop onto sloped tray 20. Slope tray 20 directs raisins (and other detached material) toward cane separator 22. Sloped tray 20 will generally include a shaker plate 38 and articulated extenders 40. Articulated extenders 40 generally comprise a series of flexible overlapping plastic panels which extend individually from shaker plate 38. Extenders 40 can thereby flex upward and around vines 16 and trellis system 18 as harvester 10 moves forward.

Shaker plate 38 will generally be positioned below the height of raisins 14 hanging from vines 16. Shaker plate 38 and extenders 40 are sloped toward cane separator 22, and vibrate to help urge the raisins downward, as will be recognized by those of skill in the art. Shaker plates 38 may be oscillated by contact between the shaker plates and the rotating paddles of the cane separator, by a shaker mechanism coupled to the harvest head drive system, or by a dedicated oscillator mechanism.

In the embodiment illustrated in FIGS. 1–3, harvester head 12 extends laterally from the right side of harvester 10, while shaker plates 38 are provided on both sides of the harvester. Harvester heads may optionally be provided on both sides of the harvester to simultaneously harvest raisins from adjacent trellis systems, or harvester head 12 may be adapted to move easily between the right and left sides of the harvester. This latter alternative facilitates re-configuring the harvester for harvesting from a single row along either the right or left side of a crop row. Still further alternatives are possible within the scope of the present invention, including disposing harvester head 12 so that beater rods 32 extend upward vertically to detach grapes from a horizontal overhead trellis canopy. In some embodiments, it may be possible to avoid a shaker mechanism by increasing the slope of sloped tray 20 toward cane separator 22.

Figure 4:
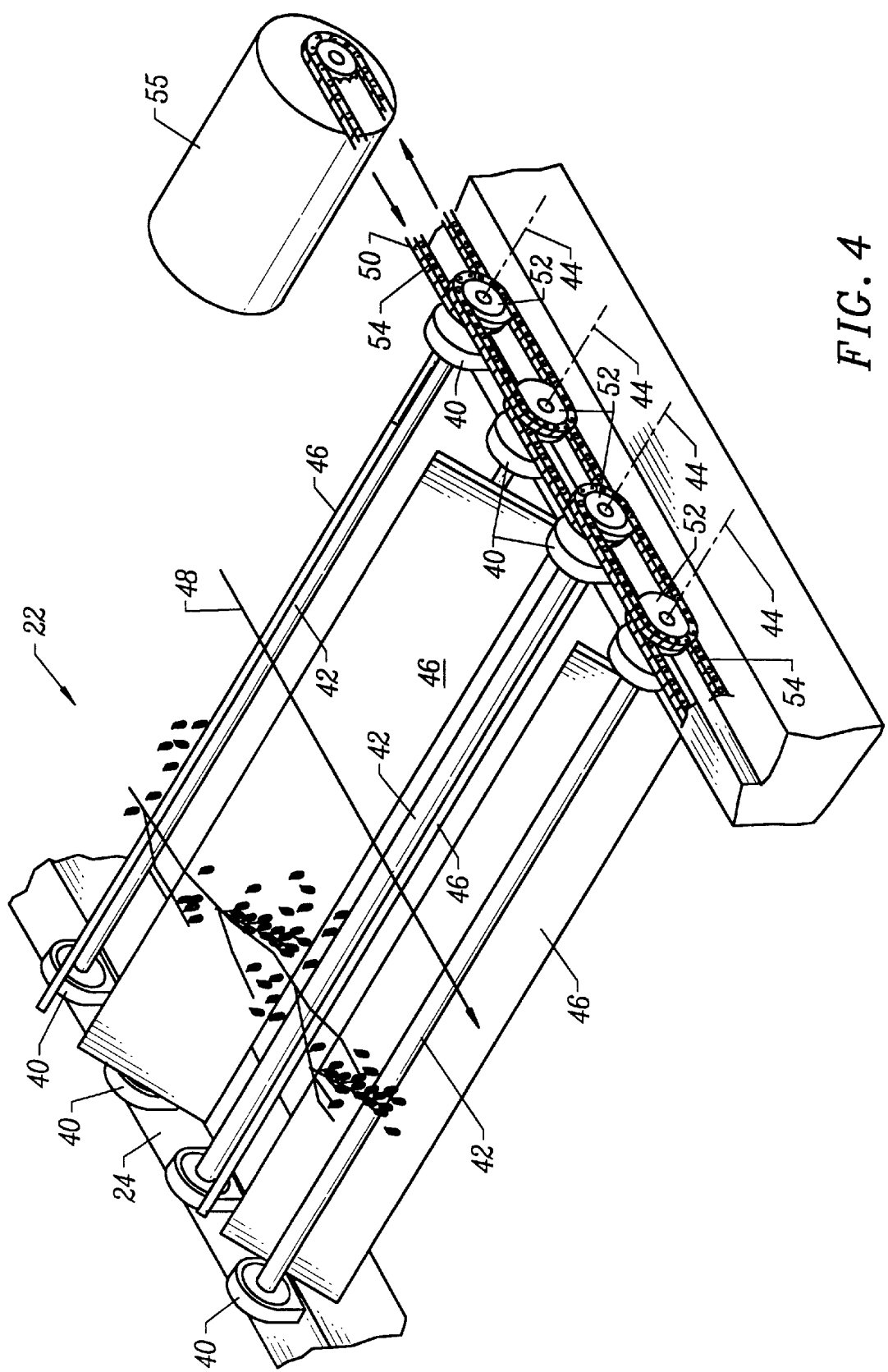
FIG. 4 is a perspective view showing a portion of the cane separator, illustrating how an offset angle between adjacent paddles allows the use of paddles which are wider than the separation distance between their axes of rotation, and also illustrates a chain drive system which maintains the offset angle between the paddles.
Figure 5:
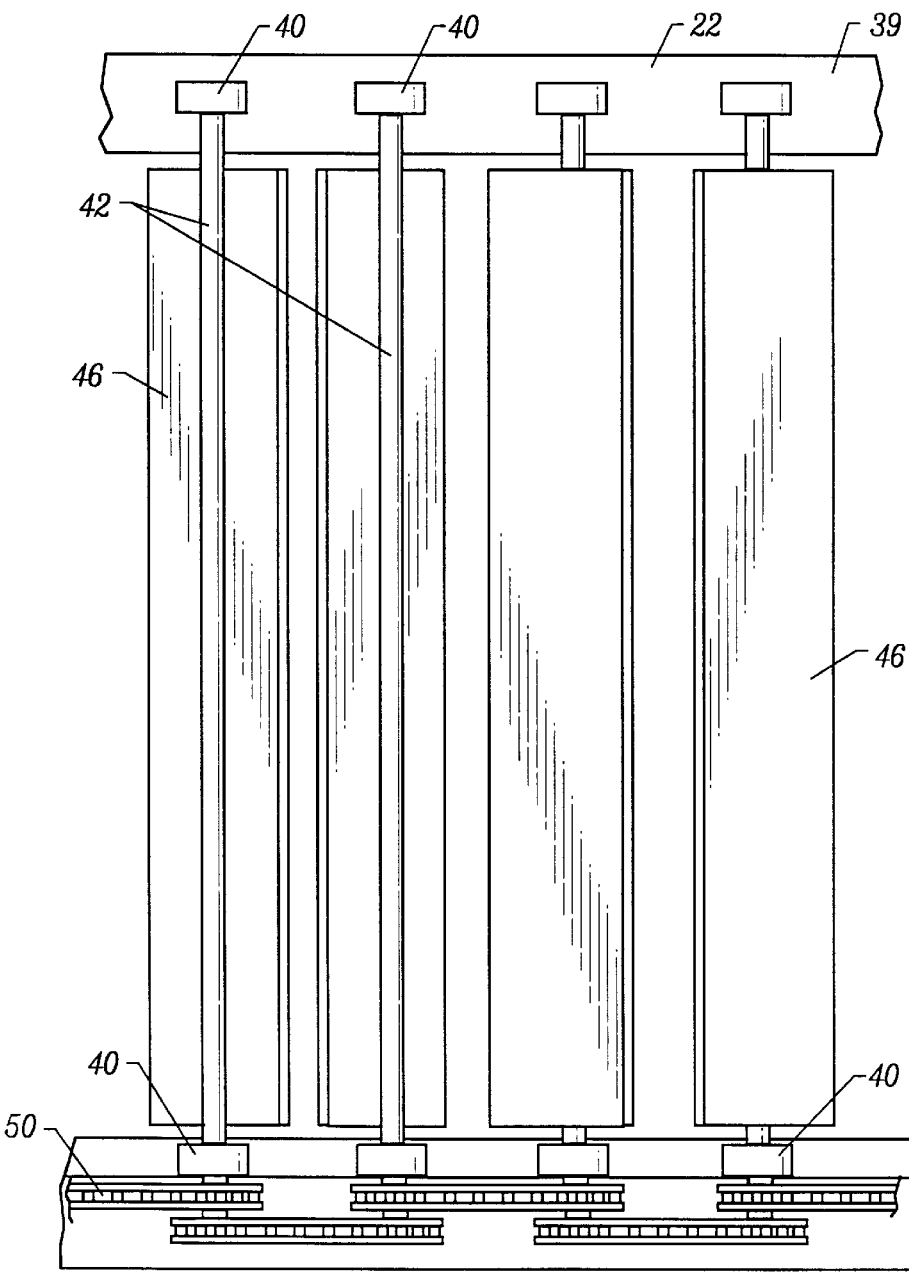
FIG. 5 is a top view of the cane separator of FIG. 4.
Figure 6:
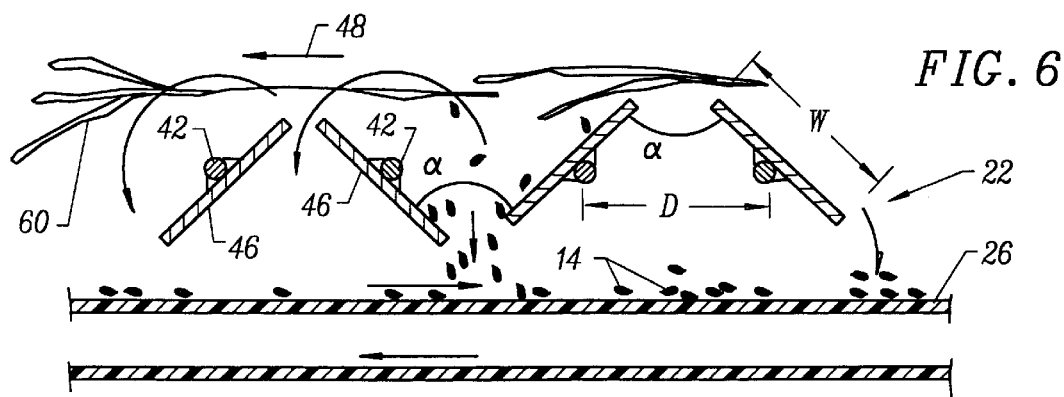
FIG. 6 is a simplified schematic side view of the cane separator of FIG. 4, and also illustrates the conveyer which transports the raisins which fall between the paddles.

The structure and operation of cane separator 22 can be understood most clearly with reference to FIGS. 4–6. Cane separator 22 generally includes a frame 39 and the frame will often be adapted to facilitate attaching the cane separator to harvester 10 by including mounting brackets, holes for fasteners, or the like. Bearings 40 are attached to frame 39 and support a series of shafts 42. Bearings 40 allow the shafts to rotate about axes 44. Axes 44 are aligned in parallel, thereby defining a cane path 48 across the axes. A paddle 46 is attached to each of shafts 42.

Shafts 42 and paddles 46 are rotated by a drive system 50. The drive system includes sprockets 52 and drive chains 54. Alternative drive systems might make use of a drive shaft extending along cane path 48, with a set of right angle bevel gears to drive each shaft 42. Still further alternative drive systems may be used, including drive belts, continuous drive chains, and the like.

Drive system 50 rotates paddles 46 in unison, and also maintains an offset angle $\alpha$ between the adjacent paddles. Preferably, angle $\alpha$ is roughly about 90°. As can be understood with reference to FIG. 6, this helps prevent contact between adjacent paddles during rotation. As a result, each of paddles 46 can have a width W which is close to, or even greater than, a separation distance D between the axes of adjacent shafts 42.

Frame 39 will generally comprise a metallic structure, typically being formed of welded or bolted steel. Bearings 40 will often be fastened to frame 39 with U-shaped brackets by bolts, but may instead be brazed, welded, or the like. Shafts 42 may be aluminum, steel, or some other metal, or may alternatively be formed of a polymer or composite such as fiberglass. Paddles 46 may also be formed of a metal, a plastic, or a composite such as fiberglass, and will ideally be flexible to accommodate any large debris which falls onto cane separator 22, thereby avoiding damage to the paddles, the drive system, or the associated drive motor. In the exemplary embodiment, shafts 42 comprise mild steel, while paddles 46 are formed of flexible polyvinyl chloride (PVC). Conveyor system 26 will generally include a commercially available conveyor belt disposed below cane separator 22.

The size of the cane separator components may vary depending on the crop being harvested. In general, frame 24 may have a length along cane path 48 of between about 6.0 feet and 10.0 feet, and a width of between about 2.0 feet and 4.0 feet. Paddles 46 generally comprise a substantially planar panel having a length between about 1 and 4 feet along the axis of the shaft, a width of between about 2 and 12 inches, and a thickness of between about $\frac{1}{32}$ and 1.0 inch. For separating dried-on-the-vine raisins from cane materials, paddles 46 will preferably each have a length of between about 2.0 feet and 4.0 feet along axes 44, a width of about 6.0 inches, and a thickness of between about $\frac{1}{16}$ inch and $\frac{3}{8}$ inch. The ends of the paddles may narrow to increase clearance from shaker plate 38.

Drive system 50 will typically be powered by a hydraulic motor 55, but may alternatively make use of a electrical motor, a gas powered motor, or the like. Such a motor for drive system 50 may have a power in the range from about 1.0 to about 10.0 horsepower, and will generally spin paddles 46 with a rotational speed of between about 20.0 and 500.0 R.P.M.

The use and operation of cane separator 22 can be understood most clearly with reference to FIG. 6. As described above, a certain amount of cane 60 is deposited on cane separator 22 together with the harvested raisins. As paddles 46 rotate about shafts 42, raisins 14 fall onto and between the paddles, passing through cane separator 22 to fall onto conveyer system 26. The larger leaves and elongate cane 60 drop on rotating paddles 46, and are urged forward by the upper portion of the rotating paddles along cane path 48. Advantageously, cane 60 bounces up and down as it travels along cane path 48, which may help further separate raisins 14 from the cane. In the preferred embodiment, a blower schematically indicated by reference numeral 62 in FIG. 6, is mounted near the rear of cane separator 22 to blow air forward over the tops of rotating paddles 46 as indicates by arrow 64. The blower helps urge cane 60 forward and also decreases the number of leaves passing through cane separator 22 to conveyor system 26.

While the exemplary embodiment has been described with reference to the harvesting of raisins and separation of the raisins from cane and other vine materials, the present invention will also find applications for separating a variety of crops from plant materials. Depending on the size, weight, and durability of the crop, it may be desirable to tailor the size and flexibility of paddles 46, the spacing between axes 44, and the rotating speed of the paddles. Still further separation may also be provided within harvester 10. For example, leaves which pass through cane separator 22 may be removed from raisins 14 using a blower or vacuum system.

A wide variety of additional modifications, changes, and adaptations of the present invention will be obvious to those of skill in the art. Hence, while the exemplary embodiment has been described in some detail, by way of illustration and for clarity of understanding, the scope of the present invention is limited solely by the appended claims.

What is claimed is:

1. A device for separating a crop from plant material, the device comprising:

a frame;

a plurality of paddles rotatably mounted to the frame, each paddle being rotatable about an axis, the axes of the paddles being aligned to define a path, each paddle having a width perpendicular to the axis and a thickness perpendicular to the width and to the axis, the thickness being less than the width so that each paddle defines first and second opposed major surfaces separated by the thickness, wherein the axes are substantially parallel, and wherein the widths of the paddles are larger than a separation distance between the axes, the major surfaces of adjacent paddles being maintained at an offset angle;

a drive system drivingly coupled to the paddles for rotating the paddles in unison so that the rotating paddles transport the plant material along the path, the paddles being sized and positioned along the path so as to detach the crop from the plant material, and such that the detached crop will fall from the path between the rotating paddles; and a system disposed below the paddles to gather the crop which falls from the path.

2. A device as claimed in claim 1, wherein adjacent axes are separated by a distance of less than the widths and more than one half the widths.

3. A device as claimed in claim 1, wherein the paddles have overall widths normal to the axes in a range between about 2 and 12 inches and overall thicknesses less than the widths.

4. A device as claimed in claim 1, wherein the paddles are supported by shafts, wherein the shafts are rotatably mounted to the frame, and wherein the drive system comprises a motor and at least one drive member which rotationally couples the motor and the paddles.

5. A device as claimed in claim 1, wherein the system comprises a conveyor belt.

6. A device as claimed in claim 5, wherein the path proceeds in a plant material direction, wherein the conveyor belt moves the crop along a crop path, the crop path proceeding in a crop direction different than the plant material direction.

7. A device as claimed in claim 1, wherein the device is transportable and adapted for field use between rows of plants with a harvester to harvest at least one of a vine crop and a tree crop.

8. A device for use with a harvester in a field to separate a vine crop from vine material, the device comprising:

a frame adapted for mounting on the harvester;

a plurality of paddles mounted to the frame, each paddle being rotatable about an axis and having a lateral width perpendicular to the axis and an overall thickness which is less than the width, the axes of the paddles being sequentially aligned so that the paddles define a path across the axes, adjacent axes being separated by less than the widths;

a drive system rotationally coupled to the paddles, the drive system maintaining an offset angle between adjacent paddles so that the paddles can rotate in unison to transport the vine material along the path, the paddles being sized and positioned along the path such that the vine crop will fall from the path between the rotating paddles.

9. A method comprising:

harvesting a crop by detaching the crop from crop plants, wherein plant material is also detached from the plants;

situating the crop and detached plant material over a series of paddles;

rotating each paddle about an associated axis so that the paddles pass the detached plant material sequentially along a path defined by the series of paddles, and separating the crop from the plant material with the paddles so that the crop falls between adjacent paddles while the detached plant material moves along the path;

and gathering the crop which falls between the paddles.

10. A method as claimed in claim 9, wherein the rotating step comprises detaching the crop from detached vine material, the crop comprising a vine crop.

11. A method as claimed in claim 10, further comprising advancing the series of rotating paddles along a row of a trellis system, the trellis system supporting the vine crop at a crop height, wherein the paddles are advanced at a height below the crop height.

12. A method as claimed in claim 11, wherein the harvesting step further comprises harvesting at least one of grapes and raisins.

13. A method as claimed in claim 9, wherein the harvesting step comprises harvesting a tree crop.

14. A method as claimed in claim 13, wherein the harvesting step further comprises harvesting olives.

15. A method as claimed in claim 9, further comprising maintaining adjacent paddles at an offset angle, the paddles having a lateral width relative to the axes which is greater than a separation distance between the axes.

16. A device as claimed in claim 1, further comprising a blower to urge the plant material along the path.

17. A device as claimed in claim 1, wherein the paddles move the plant material up and down as it travels along the path to separate any crop still attached to the plant material.

18. A device as claimed in claim 1, wherein the paddles are substantially planar.

* * * * *